(12) United States Patent
Yip et al.

(10) Patent No.: US 7,376,951 B1
(45) Date of Patent: May 20, 2008

(54) METHOD AND APPARATUS FOR CONTROLLING PROCESS DEPENDENCIES

(75) Inventors: Michael Yip, Sunnyvale, CA (US); Anna Berenberg, Los Altos, CA (US)

(73) Assignee: Extreme Networks, Santa Clara, CA (US)

( * ) Notice: Subject to any disclaimer, the term of this patent is extended or adjusted under 35 U.S.C. 154(b) by 856 days.

(21) Appl. No.: 10/236,403

(22) Filed: Sep. 6, 2002

(51) Int. Cl.
*G06F 9/46* (2006.01)
(52) U.S. Cl. ...................... 718/102; 718/100
(58) Field of Classification Search ............. 718/102, 718/100
See application file for complete search history.

(56) References Cited

U.S. PATENT DOCUMENTS

| | | | |
|---|---|---|---|
| 5,835,911 A * | 11/1998 | Nakagawa et al. | 707/203 |
| 6,658,659 B2 * | 12/2003 | Hiller et al. | 717/170 |
| 6,871,344 B2 * | 3/2005 | Grier et al. | 717/162 |
| 2002/0042870 A1 * | 4/2002 | Rocray et al. | 712/10 |
| 2004/0045012 A1 * | 3/2004 | Doraisamy | 719/321 |

* cited by examiner

*Primary Examiner*—Meng-Al T. An
*Assistant Examiner*—Kenneth Tang
(74) *Attorney, Agent, or Firm*—Blakely, Sokoloff, Taylor & Zafman LLP

(57) ABSTRACT

A method and system is provided to control and check run-time process dependencies. When a process manager receives a request to start a new process, the process manager accesses a configuration file to check if the new process depends on any other processes to be running and what versions of these prerequisite processes are required. If an exact version is specified in the configuration file, the prerequisite process version must match the exact version specified to be compatible with the new process. If a range of acceptable versions is specified in the configuration file, the prerequisite process version must fall within the range of acceptable versions to be compatible with the new process. If a minimum acceptable version is specified in the configuration file, then the prerequisite process version must be greater than or equal to the minimum acceptable version specified. If a maximum acceptable version is specified in the configuration file, then the prerequisite process version must be less than or equal to the maximum acceptable version specified. If the prerequisite processes are not running or the versions of the running prerequisite processes are not compatible with the new process, then the new process is not started. If the new process does not depend on any processes or all the prerequisite are running with compatible versions, then the new process may be started.

20 Claims, 3 Drawing Sheets

METHOD AND APPARATUS FOR CONTROLLING PROCESS DEPENDENCIES

TECHNICAL FIELD

The invention relates to the field of network management. In particular, the invention relates to a process manager that controls the dependencies of processes running on a router.

BACKGROUND AND DESCRIPTION OF RELATED ART

The architecture of high-performance Internet routers has advanced in the last several years to provide increased performance in routing ever-greater volumes of network traffic. It is not uncommon for a router to support numerous protocols as well as several applications for configuration and maintenance of the router tables, protocols, and network policies. These advances have increased the complexity of the router such that the management of applications and protocols running on the router is critical for reliable network performance.

In existing router management technology, the logic to support the applications, protocols, and associated management interfaces is centrally managed in a single master program. This can result in a single point of failure, meaning that even if there is a problem with only one protocol or application or interface, the entire program could crash, bringing the router down with it. In addition, if the master program needs to be updated, for example to accommodate a new protocol, then the master program must be brought down in order to perform the updates, thereby temporarily taking the router out of service.

In an effort to overcome some of the limitations in existing router management technology, management of applications, protocols, and associated management interfaces may be decentralized. However, this means that there will be several processes running simultaneously on both the active Router Protocol (RP) and line cards. These multiple processes may or may not be dependent on other processes which run on the same processor. Furthermore, those processes that are dependent on other processes may only be compatible with certain versions of those other processes. Since the processes share the limited resources of the processor, it is important to insure that the dependent processes are started only when the other processes on which they depend are already running and compatible to avoid taking up valuable resources unnecessarily.

SUMMARY

A method and system is provided to control run-time process dependency. According to one aspect of the invention, a dependent process is not started if the prerequisite conditions for running the process are not satisfied. According to one aspect of the invention, the prerequisite conditions for a given dependent process may include the existence of one or more prerequisite processes. A prerequisite process exists if the prerequisite process is currently running. According to one aspect of the invention, the prerequisite conditions may further include the existence of a compatible version of one or more prerequisite processes. If a running prerequisite process is not compatible with the dependent process, the dependent process is not started.

According to one aspect of the invention, the running prerequisite process is not compatible with the dependent process if the version of the running prerequisite process does not match an acceptable version specified in a configuration file. According to one aspect of the invention, the running prerequisite process is not compatible with the dependent process if the version of the running prerequisite process does not fall within an acceptable range of versions specified in the configuration file. According to one aspect of the invention, the running prerequisite process is not compatible with the dependent process if the version of the running prerequisite process is not greater than or equal to the minimum version specified in the configuration file. According to one aspect of the invention, the running prerequisite process is not compatible with the dependent process if the version of the running prerequisite process is not less than or equal to the maximum version specified in the configuration file.

According to one aspect of the invention, apparatus are provided to carry out the above and other methods.

BRIEF DESCRIPTION OF DRAWINGS

The invention is illustrated by way of example, and not by way of limitation, in the figures of the accompanying drawings in which like reference numerals refer to similar elements.

DETAILED DESCRIPTION

Embodiments of a system and method for controlling process dependencies are described. In the following description, numerous specific details are provided for a thorough understanding of embodiments of the invention. However, it will be apparent to those skilled in the art that the invention may be practiced with only some or all of the described aspects of the invention, and with or without some or all of the specific details. In some instances, well known architectures, steps, and techniques have not been shown to avoid unnecessarily obscuring the invention. For example, specific details are not provided as to whether the method and apparatus is implemented in a switch, router, bridge, server or gateway, as a software routine, hardware circuit, firmware, or a combination thereof.

Various operations will be described as multiple discrete steps performed in turn in a manner that is most helpful in understanding the invention. However, the order of description should not be construed as to imply that these operations are necessarily performed in the order they are presented, or even order dependent.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
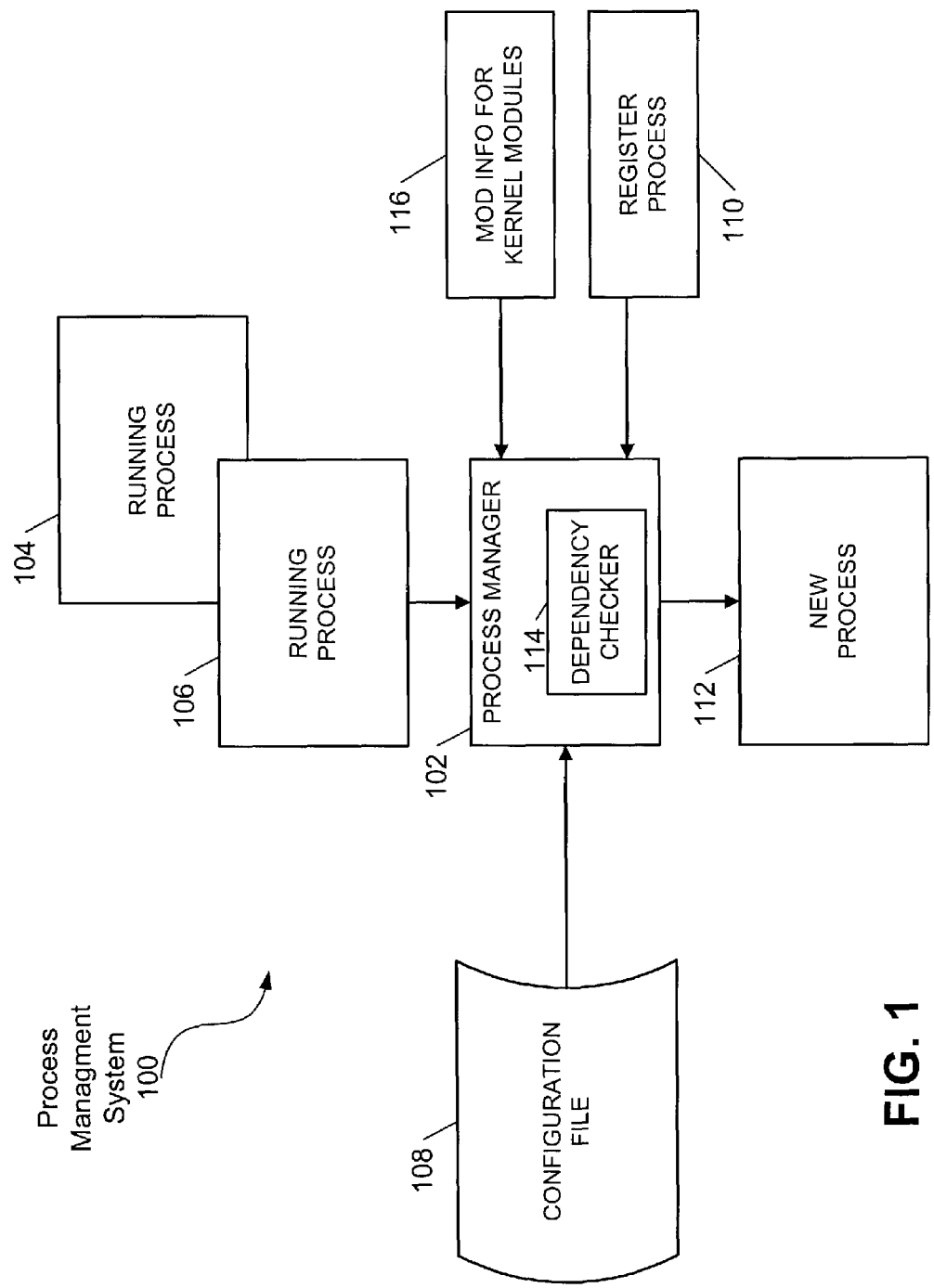
FIG. 1 illustrates is a block diagram illustrating one generalized embodiment of a process management system incorporating the invention.

FIG. 1 is a block diagram illustrating one generalized embodiment of a process management system 100 incorporating the invention. Those of ordinary skill in the art will appreciate that the system 100 may include more components than those shown in FIG. 1. However, it is not necessary that all of these generally conventional components be shown in order to disclose an illustrative embodiment for practicing the invention. As illustrated, the process management system 100 includes a process manager 102. There may be one or more processes running in system 100, such as process 104 and process 106.

The process manager 102 includes a dependency checker 114 to check the dependencies of processes running in system 100. When a process registers with process manager 102, the process manager 102 records the version number of the process. In one embodiment, the process manager 102 may also check dependencies for kernel modules. For kernel modules, the process manager 102 will call a Linux program 116, such as a modinfo program, to get a description of the module.

Before starting a new process or application 112, the process manager 102 first checks a configuration file 108 to determine whether the process 112 depends on other processes to be running and what versions of these prerequisite processes are required. In one embodiment, if the configuration file location is supplied to the process manager 102 from the command line, the process manager 102 will look in the specified location. Otherwise, the process manager 102 will look in the configuration directory. The process manager 102 may also look in directories where applications reside. In one embodiment, if the configuration file 108 is not found, the process manager 102 assumes that the process 112 has no dependencies.

If a prerequisite process is not currently running or a running prerequisite process does not meet the version requirement, then the new process 112 is not started. In one embodiment, there are several options for version requirements. In one embodiment, there is an exact version requirement option. This option may be selected when the process to be started is only compatible with one version of a prerequisite process, so the prerequisite process must meet the exact version specified in the configuration file. In one embodiment, there is a range of versions requirement option. Under this option, a range of acceptable versions of a prerequisite process may be specified. In one embodiment, there is a minimum version option. Under this option, the prerequisite process must be a version that is equal to or greater than the specified minimum version. In one embodiment, there is a maximum version option. Under this option, the prerequisite process must be equal to or smaller than the specified maximum version. The version requirements ensure that the new dependent process 112 is not started if a prerequisite process is not running with a version that is compatible with the dependent process 112.

Figure 2:
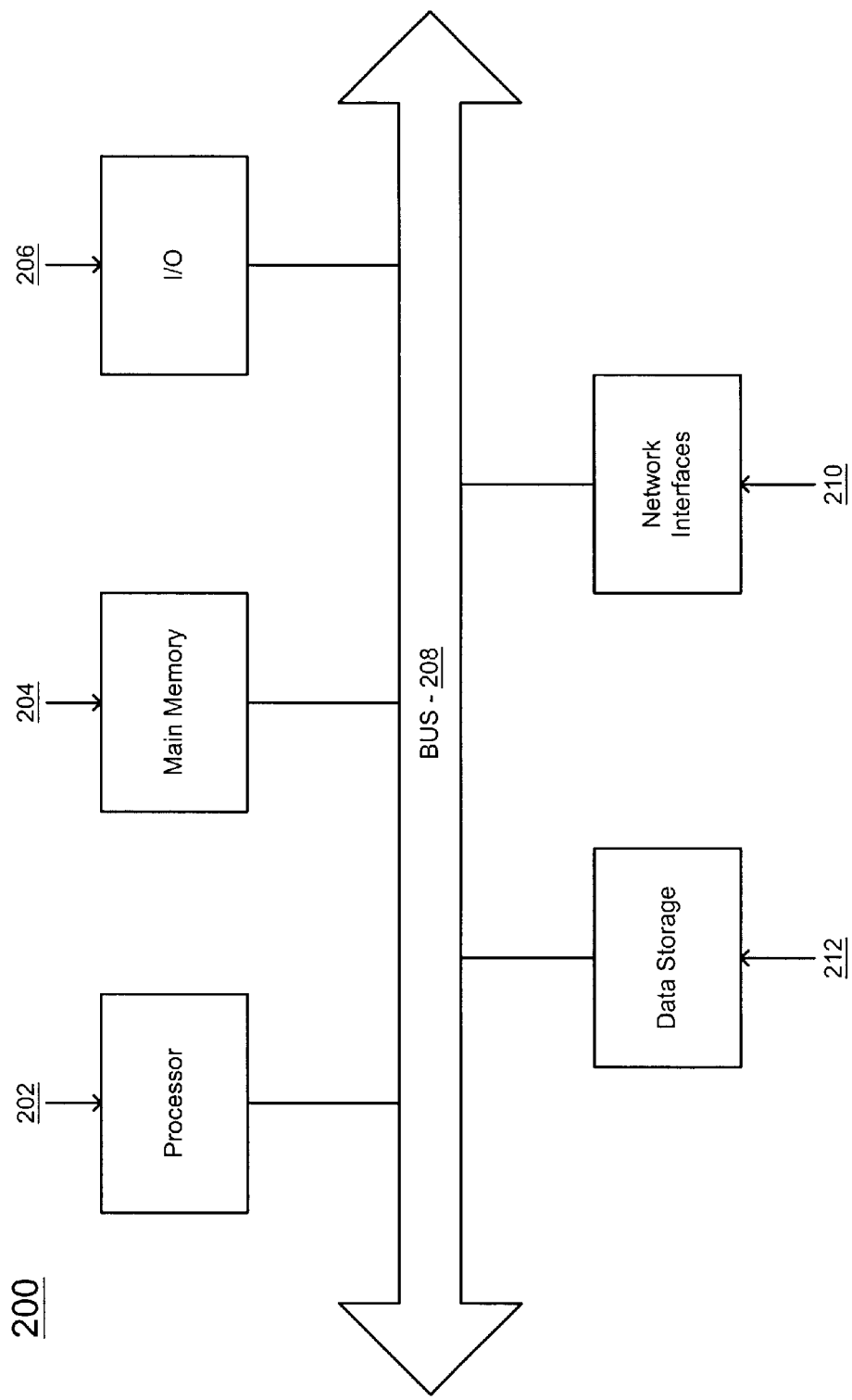
FIG. 2 is a block diagram illustrating a suitable computing environment in which certain aspects of the illustrated invention may be practiced.

FIG. 2 is a block diagram illustrating a suitable computing environment in which certain aspects of the illustrated invention may be practiced. In one embodiment, the method for a process management system 100 may be implemented on a computer system 200 having components 202-212, including a processor 202, a memory 204, an Input/Output device 206, a data storage 212, and a network interface 210, coupled to each other via a bus 208. The components perform their conventional functions known in the art and provide the means for implementing the process management system 100. Collectively, these components represent a broad category of hardware systems, including but not limited to general purpose computer systems and specialized packet forwarding devices. It is to be appreciated that various components of computer system 200 may be rearranged, and that certain implementations of the present invention may not require nor include all of the above components. Furthermore, additional components may be included in system 200, such as additional processors (e.g., a digital signal processor), storage devices, memories, and network or communication interfaces.

Figure 3:
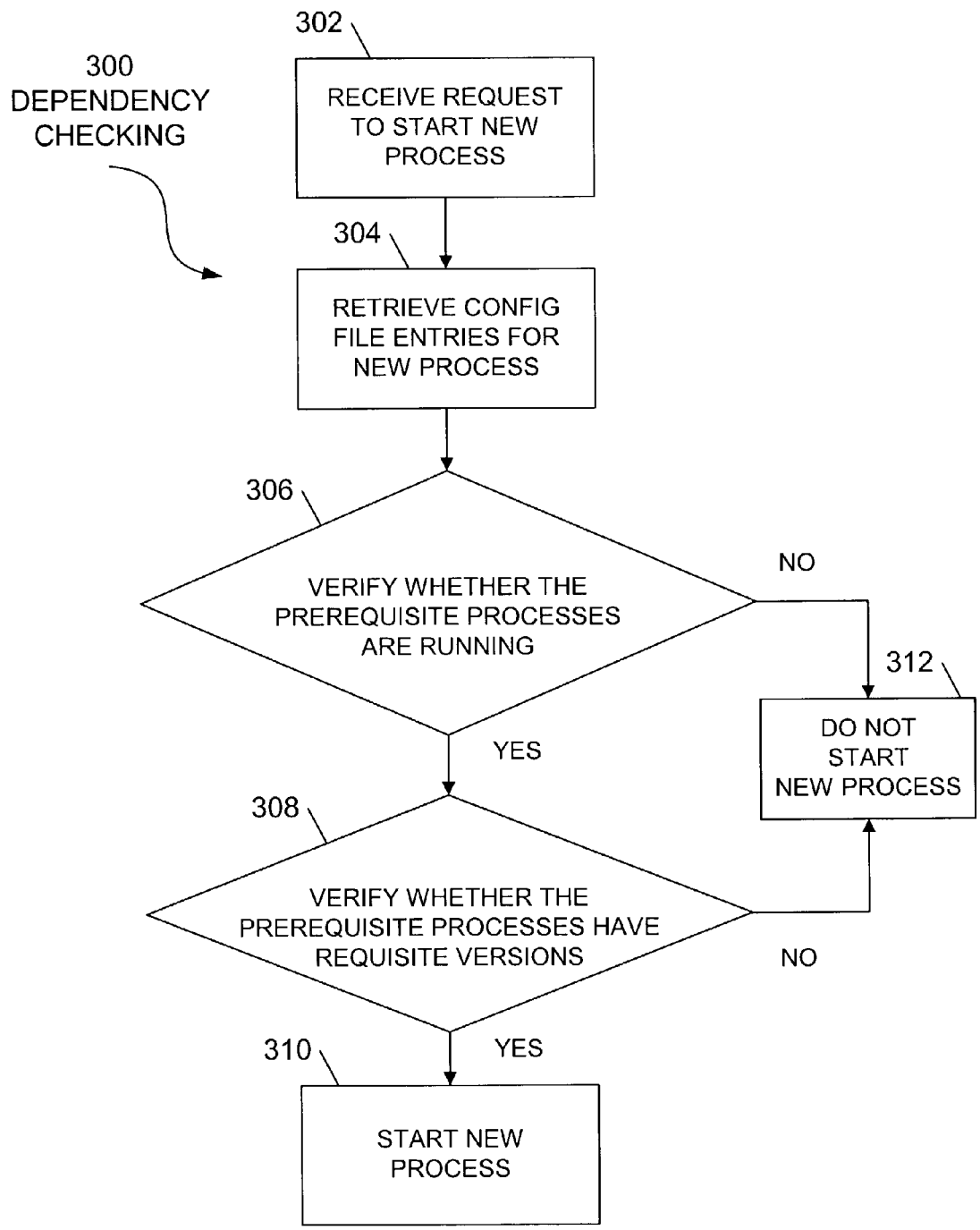
FIG. 3 is a flow diagram illustrating certain aspects of a method to be performed by a computer executing one embodiment of the illustrated invention.

FIG. 3 is a flow diagram illustrating certain aspects of a method of dependency checking 300 to be performed by a computer executing one embodiment of the illustrated invention. The methods to be performed by a processor on a router or other network device constitute computer programs made up of computer-executable instructions. Describing the methods by reference to a flowchart enables one skilled in the art to develop such programs including such instructions to carry out the methods on suitably configured computers, in which the processor of the computer execute the instructions from computer-accessible media. The computer-executable instructions may be written in a computer programming language or may be embodied in firmware logic such as an application-specific integrated circuit (ASIC). If written in a programming language conforming to a recognized standard, such instructions can be executed on a variety of hardware platforms and for interface to a variety of operating systems. In addition, the invention is not described with reference to any particular programming language. It will be appreciated that a variety of programming languages may be used to implement the teachings of the invention as described herein. Furthermore, it is common in the art to speak of software, in one form or another, for example a program, procedure, process, or application, as taking an action or causing a result. Such expressions are merely a shorthand way of saying that execution of the software by a computer causes the processor of the computer to perform an action or a produce a result.

The method begins at 302, where a request is received to start a new process. Then, at 304, the configuration file 108 is retrieved and read for dependency entries for the new process. At 306, a determination is made as to whether the prerequisite processes are running. If any one of the prerequisite processes is not running, then at 312, the new process is not started. If all of the prerequisite processes are running, then at 308, a determination is made as to whether the prerequisite processes have the requisite versions.

In one embodiment, the version requirement is checked to determine whether an exact version, a range of versions, a minimum version, or a maximum version requirement has been specified in the configuration file. Under the exact version requirement, the prerequisite process must have the exact version specified in the configuration file. Under the range of versions requirement, the prerequisite process version must fall within the range of acceptable versions specified in the configuration file. Under the minimum version requirement, the prerequisite process version must be equal to or greater than the specified minimum version in the configuration file. Under the maximum version requirement, the prerequisite process version must be equal to or smaller than the specified maximum version in the configuration file.

If any one of the prerequisite processes does not meet the requisite version requirements, then at 312, the new process is not started. If all prerequisite processes meet the requisite version requirements, then at 310, the new process may be started. If the new process does not depend on any other processes to be running, then the new process may be started.

As will be appreciated by those skilled in the art, the content for implementing an embodiment of the method of the invention, for example, computer program instructions, may be provided by any machine-readable media which can store data that is accessible by system 100, as part of or in addition to memory, including but not limited to cartridges, magnetic cassettes, flash memory cards, digital video disks, random access memories (RAMs), read-only memories (ROMs), and the like. In this regard, the system 100 is equipped to communicate with such machine-readable media in a manner well-known in the art.

It will be further appreciated by those skilled in the art that the content for implementing an embodiment of the method of the invention may be provided to the system 100 from any external device capable of storing the content and communicating the content to the system 100. For example, in one embodiment, the system 100 may be connected to a network, and the content may be stored on any device in the network.

An illustrative example of one embodiment of the method of the invention will now be described. For purposes of illustration, two processes 104 and 106 are running. Process 104 is a cliMaster application with version 9.3.0.1. Process 106 is a dirser application with version 9.0.1.1. Assume there is a request to start a new process 112. New process 112 is a route manager application (rtmgr) with version 9.1.1.0.

When the process manager 102 receives the request to start new process 112, the process manager looks for the configuration file 108. Assume the process manager 102 finds the configuration file 108 in the configuration directory. Assume that configuration file 108 has the following dependency entries for the process rtmgr 112:

proc=rtmgr: depend=dirser: version=9.0.1.1:version=9.0.0.1:version=9.0.1.3:
  proc=rtmgr: depend=cliMaster: range=9.0.1.1~9.3.0.1:

In this example, proc indicates the process name, depend indicates the prerequisite process name, version indicates the exact version of the prerequisite process required, range indicates the ranges of acceptable versions of the prerequisite process, min indicates the minimum acceptable version of the prerequisite process, and max indicates the maximum acceptable version of the prerequisite process.

In this example, the process manager finds two dependency entries for the process rtmgr 112. The first entry indicates that the process rtmgr depends on the process dirser to be running. There are three exact versions specified for the dirser process: 9.0.1.1, 9.0.0.1, and 9.0.1.3. In order for the process manager to start the rtmgr process 112, the dirser process must be running with one of the three exact versions specified. The process manager checks and determines that the dirser process 106 is running. The version of the running dirser process 106 is 9.0.1.1. This version meets the exact version requirements specified. Therefore, the process manager checks the next dependency requirement. The second entry in the configuration file regarding the rtmgr process indicates that rtmgr depends on the process cliMaster to be running with a version in the range of 9.0.1.1 to 9.3.0.1. The process manager checks and determines that the cliMaster process 104 is running with version 9.3.0.1. This version falls within the range specified in the configuration file. There are no other dependencies specified in the configuration file for the rtmgr process 112. Therefore, the process manager 102 may start the rtmgr process 112. When the rtmgr process starts, it registers with the process manager 102 and reports its version number of 9.1.1.0. The process manager 102 saves the version number of the new process.

Assume the process manager 102 then receives a request to start a new process ospfd. The process manager 102 retrieves the configuration file 108 and finds one entry for the process ospfd:

proc=ospfd: depend=rtmgr: min=9.1.1.1:

The process manager 102 checks and determines that the rtmgr process 112 is running. Then, the process manager 102 checks the version of the running rtmgr process, which is version 9.1.1.0. This running version must be equal to or greater than the version specified in the configuration file. Since the running version 9.1.1.0 is smaller than the minimum version of 9.1.1.1 specified in the configuration file, the version requirement is not met, so the ospfd process is not started.

The above description of illustrated embodiments of the invention, including what is described in the abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for starting a dependent process in a network device, comprising:

starting one or more processes in the network device;
  registering the one or more processes with a process manager running in the network device;
  receiving, after the one or more processes are running in the network device, a request to start a second process in the network device;
  accessing a configuration file to determine if the second process is dependent on one or more prerequisite processes that must be running before the second process can be started, the configuration file further identifying a version of each prerequisite process required by the dependent process;
  if there is a prerequisite process of the second process defined in the configuration file, comparing the one or more prerequisite processes with the one or more registered running processes to determine if each of the one or more prerequisite processes is running in the network device and whether the second process is compatible with the version identifier of each of the one or more running prerequisite processes; and
  starting the second process only if every prerequisite process of the second process is running and the second process is compatible with the version identifier of each of the one or more running prerequisite processes.

2. The method of claim 1, wherein the configuration file is accessed by the process manager and contains one or more dependency entries for a dependent process, each dependency entry defining the prerequisite process of the dependent process and the version of the prerequisite process required by the dependent process.

3. The method of claim 2, wherein determining whether the second process is compatible with the version identification of each of the one or more prerequisite processes comprises:
obtaining, from the configuration file, a version requirement of the second process for each prerequisite process;
comparing the version requirement for each prerequisite process to the version identifier registered by each prerequisite process; and
determining whether the version identifier registered by each prerequisite process satisfies the version requirement of the second process, wherein the version requirement is that the prerequisite process be an exact match of a particular version.

4. The method of claim 2, wherein determining whether the second process is compatible with the version identification of each of the one or more prerequisite processes comprises:
obtaining, from the configuration file, a version requirement of the second process for each prerequisite process;
comparing the version requirement for each prerequisite process to the version identifier registered by each prerequisite process; and
determining whether the version identifier registered by each prerequisite process satisfies the version requirement of the second process, wherein the version requirement is that the prerequisite process be within a range of acceptable versions.

5. The method of claim 2, wherein determining whether the second process is compatible with the version identification of each of the one or more prerequisite processes comprises:
obtaining, from the configuration file, a version requirement of the second process for each prerequisite process;
comparing the version requirement for each prerequisite process to the version identifier registered by each prerequisite process; and
determining whether the version identifier registered by each prerequisite process satisfies the version requirement of the second process, wherein the version requirement is that the prerequisite process be greater than or equal to a minimum acceptable version.

6. The method of claim 2, wherein determining whether the second process is compatible with the version identification of each of the one or more prerequisite processes comprises:
obtaining, from the configuration file, a version requirement of the second process for each prerequisite process;
comparing the version requirement for each prerequisite process to the version identifier registered by each prerequisite process; and
determining whether the version identifier registered by each prerequisite process satisfies the version requirement of the second process, wherein the version requirement is that the prerequisite process be less than or equal to a maximum acceptable version.

7. The method of claim 1, wherein the network device is a router and the second process is a route manager application process to be run on the active Router Protocol (RP).

8. A system for controlling process dependency in a network device comprising:
a process manager to be run in the network device;
one or more processes to be started in the network device and to be registered with the process manager;
a second process to be run in the network device after the one or more processes are running in the network device;
data in a configuration file identifying the second process as dependent on one or more prerequisite processes that must be running before the second process can be started the data also identifying a version of each prerequisite process required by the dependent process; and
a processor to compare the data in the configuration file with the one or more running processes registered with the process manager to determine if each of the one or more prerequisite processes is running in the network device and that the second process is compatible with the version identifier of each of the one or more running prerequisite processes, and to start the second process only after determining that every prerequisite processes is running and each is of a compatible version.

9. The system of claim 8, wherein the configuration file is accessed by the process manager and the data contains one or more dependency entries for a dependent process, each dependency entry defining the prerequisite process of the dependent process and defining the version of the prerequisite process required by the dependent process.

10. The system of claim 8, wherein each of the one or more prerequisite processes is compatible with the second process if the prerequisite process version registered with the process manager matches the version identifier defined by the configuration file data.

11. The system of claim 8, wherein the version identifier specifies an earliest acceptable version and wherein the second process is compatible with each of the one or more prerequisite processes if the version of each prerequisite process registered with the process manager matches or is later than the earliest acceptable version specified.

12. The system of claim 8, wherein the version identifier specifies a latest acceptable version and wherein the second process is compatible with each of the one or more prerequisite processes if the version of each prerequisite process registered with the process manager matches or is earlier than the latest acceptable version specified.

13. The system of claim 8, wherein the version identifier specifies a range of acceptable versions and wherein the second process is compatible with each of the one or more prerequisite processes if the version of each prerequisite process registered with the process manager falls within the range of acceptable versions specified.

14. The system of claim 8, wherein the network device is a router and the second process is a route manager application process to be run on the active Router Protocol (RP).

15. A computer-readable storage media with instruction stored thereon, which when executed, causes a computer to perform the method comprising:
starting one or more processes in the network device;
registering the one or more processes with a process manager running in the network device;
receiving, after the one or more processes are running in the network device, a request to start a second process in the network device;
accessing a configuration file to determine if the second process is dependent on one or more prerequisite processes that must be running before the second process can be started, the configuration file further identifying a version of each prerequisite process required by the dependent process;

if there is a prerequisite process of the second process defined in the configuration file, comparing the one or more prerequisite processes with the one or more registered running processes to determine if each of the one or more prerequisite processes is running in the network device and whether the second process is compatible with the version identifier of each of the one or more running prerequisite processes; and starting the second process only if every prerequisite process of the second process is running and the second process is compatible with the version identifier of each of the one or more running prerequisite processes.

16. The media of claim 15, wherein the configuration file is accessed by the process manager and contains one or more dependency entries for a dependent process, each dependency entry defining the prerequisite process of the dependent process and defining the version of the prerequisite process required by the dependent process.

17. The media of claim 15, wherein determining whether the second process is compatible with the version identification of each of the one or more prerequisite processes comprises:

obtaining, from the configuration file, a version requirement of the second process for each prerequisite process;

comparing the version requirement for each prerequisite process to the version identifier registered by each prerequisite process; and determining whether the version identifier registered by each prerequisite process satisfies the version requirement of the second process, wherein the version requirement is that the prerequisite process be an exact match of a particular version.

18. The media of claim 15, wherein determining whether the second process is compatible with the version identification of each of the one or more prerequisite processes comprises:

obtaining, from the configuration file, a version requirement of the second process for each prerequisite process;

comparing the version requirement for each prerequisite process to the version identifier registered by each prerequisite process; and determining whether the version identifier registered by each prerequisite process satisfies the version requirement of the second process, wherein the version requirement is that the prerequisite process be within a range of acceptable versions.

19. The media of claim 15, wherein determining whether the second process is compatible with the version identification of each of the one or more prerequisite processes comprises:

obtaining, from the configuration file, a version requirement of the second process for each prerequisite process;

comparing the version requirement for each prerequisite process to the version identifier registered by each prerequisite process; and determining whether the version identifier registered by each prerequisite process satisfies the version requirement of the second process, wherein the version requirement is that the prerequisite process be greater than or equal to a minimum acceptable version.

20. The media of claim 15, wherein determining whether the second process is compatible with the version identification of each of the one or more prerequisite processes comprises:

obtaining, from the configuration file, a version requirement of the second process for each prerequisite process;

comparing the version requirement for each prerequisite process to the version identifier registered by each prerequisite process; and determining whether the version identifier registered by each prerequisite process satisfies the version requirement of the second process, wherein the version requirement is that the prerequisite process be less than or equal to a maximum acceptable version.

* * * * *